(12) United States Patent
Shatters

(10) Patent No.: US 12,157,418 B2
(45) Date of Patent: Dec. 3, 2024

(54) AUTOMATIC FIELD OF VIEW ADJUSTMENT FOR VIDEO ON MOBILE EQUIPMENT BASED ON MACHINE STATE

(71) Applicant: Caterpillar Inc., Peoria, IL (US)

(72) Inventor: Aaron R. Shatters, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 319 days.

(21) Appl. No.: 17/867,469

(22) Filed: Jul. 18, 2022

(65) Prior Publication Data
US 2024/0017672 A1    Jan. 18, 2024

(51) Int. Cl.
*B60R 1/28* (2022.01)

(52) U.S. Cl.
CPC .......... *B60R 1/28* (2022.01); *B60R 2300/102* (2013.01); *B60R 2300/105* (2013.01)

(58) Field of Classification Search
CPC ................ B60R 1/28; B60R 2300/102; B60R 2300/105
USPC ........................................................ 348/148
See application file for complete search history.

(56) References Cited

U.S. PATENT DOCUMENTS

| | | | |
|---|---|---|---|
| 10,721,397 B2 | 7/2020 | Ali et al. | |
| 2014/0111648 A1 | 4/2014 | Ishimoto | |
| 2017/0061689 A1 | 3/2017 | Petrany et al. | |
| 2022/0073010 A1* | 3/2022 | Berne | B60J 1/002 |
| 2023/0311990 A1* | 10/2023 | Hirayama | H04N 23/90 |

FOREIGN PATENT DOCUMENTS

| | | |
|---|---|---|
| JP | 4535277 B2 | 9/2010 |
| WO | 2018079878 A1 | 5/2018 |

\* cited by examiner

*Primary Examiner* — Allen C Wong
(74) *Attorney, Agent, or Firm* — Procopio, Cory, Hargreaves & Savitch LLP

(57) ABSTRACT

In mobile equipment that is configured for remote operation there are the competing interests of minimizing the number and complexity of cameras by using wide-angle cameras, while avoiding the fisheye distortion inherent in wide-angle cameras, which can be disorienting to remote operators. Thus, a method is disclosed that switches between video processing configurations depending on a machine state of the mobile equipment. For example, a first machine state may represent that the mobile equipment is immobile, whereas a second machine state may represent that the mobile equipment is mobile. In the first machine state, the video configuration does not correct for fisheye distortion, so as to maximize the field of view in the video while the mobile equipment is immobile. In the second machine state, the video configuration does correct for fisheye distortion, so as to prevent disorientation of the remote operator while the mobile equipment is mobile.

20 Claims, 5 Drawing Sheets

AUTOMATIC FIELD OF VIEW ADJUSTMENT FOR VIDEO ON MOBILE EQUIPMENT BASED ON MACHINE STATE

TECHNICAL FIELD

The embodiments described herein are generally directed to operation of mobile equipment, and, more particularly, to automatic field of view adjustment for video on mobile equipment based on a machine state of the mobile equipment.

BACKGROUND

Mobile equipment may comprise one or more cameras that are positioned and mounted to capture video of one or more areas around the mobile equipment. When operating the mobile equipment from within the vehicle cabin, the operator can use the video from these cameras to view hard-to-see areas, such as those to the rear and/or sides of the mobile equipment. When operating the mobile equipment remotely from a remote terminal, these cameras may serve the same purpose but should also include a forward-facing camera so that the remote operator can view the area in front of the mobile equipment.

It is generally desirable to minimize the number of cameras. One reason is the cost of additional cameras, as well as their associated mounting provisions and wiring. Another reason is that an operator has limited ability to efficiently consume and process the information provided by additional camera views.

However, it also desirable to provide a full 360-degree field of view (FOV) of the area surrounding the mobile equipment, without blind spots between the individual fields of view of the cameras. For this reason, the cameras are often very wide-angle cameras (e.g., fisheye cameras) that each have a 120-degree field of view or greater. The problem with using wide-angle cameras is that images from wide-angle cameras are distorted relative to a standard rectilinear projection. This results in the appearance of straight lines in the real world as curved lines in the video.

This fisheye distortion can be disorienting to the operator when the mobile equipment is moving relative to its environment. While the distorted image frames of the video can be corrected using rectilinear projection (e.g., according to the Scaramuzza fisheye camera model), a very wide field of view, when corrected by rectilinear projection, looks unnatural. Thus, the corrected image frames are typically cropped after correction, which reduces the field of view present in the video. As a result of this reduction in the field of view from one or more cameras, the full 360-degree field of view may not be possible. In other words, the video that is displayed to the operator may comprise blind spots with respect to the area around the mobile equipment.

U.S. Patent Pub. No. 2014/0111648 discloses a means for automatically switching between a standard image and an extended rear image according to operating conditions of a machine. However, the publication does not address configuring distortion correction based on machines states related to mobilization of the machine.

The present disclosure is directed toward overcoming one or more of the problems discovered by the inventor.

SUMMARY

In an embodiment, a method comprises using at least one hardware process to: monitor for a plurality of machine states of a mobile equipment, wherein the plurality of machine states include a first machine state representing that the mobile equipment is immobile, and a second machine state representing that the mobile equipment is mobile; when detecting a switch from the first machine state to the second machine state, switch from a first configuration for processing video, captured by a plurality of cameras mounted on the mobile equipment, to a second configuration for processing the video, wherein the video in the first configuration has a wider field of view than the video in the second configuration (e.g., because in the first configuration, the video is not corrected for fisheye distortion, and in the second configuration, the video captured by one or more of the plurality of cameras is corrected for fisheye distortion); and, when detecting a switch from the second machine state to the first machine state, switch from the second configuration to the first configuration.

In an embodiment, a mobile equipment comprises: a plurality of cameras; and at least one hardware processor that monitors for a plurality of machine states of the mobile equipment, wherein the plurality of machine states include a first machine state representing that the mobile equipment is immobile, and a second machine state representing that the mobile equipment is mobile, when detecting a switch from the first machine state to the second machine state, switches from a first configuration for processing video, captured by the plurality of cameras, to a second configuration for processing the video, wherein the video in the first configuration has a wider field of view than the video in the second configuration, and, when detecting a switch from the second machine state to the first machine state, switches from the second configuration to the first configuration.

In an embodiment, a non-transitory computer-readable medium has instructions stored thereon, wherein the instructions, when executed by a processor, cause the processor to: monitor for a plurality of machine states of a mobile equipment, wherein the plurality of machine states include a first machine state representing that the mobile equipment is immobile, and a second machine state representing that the mobile equipment is mobile; when detecting a switch from the first machine state to the second machine state, switch from a first configuration for processing video, captured by a plurality of cameras mounted on the mobile equipment, to a second configuration for processing the video, wherein the video in the first configuration has a wider field of view than the video in the second configuration; and, when detecting a switch from the second machine state to the first machine state, switch from the second configuration to the first configuration.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
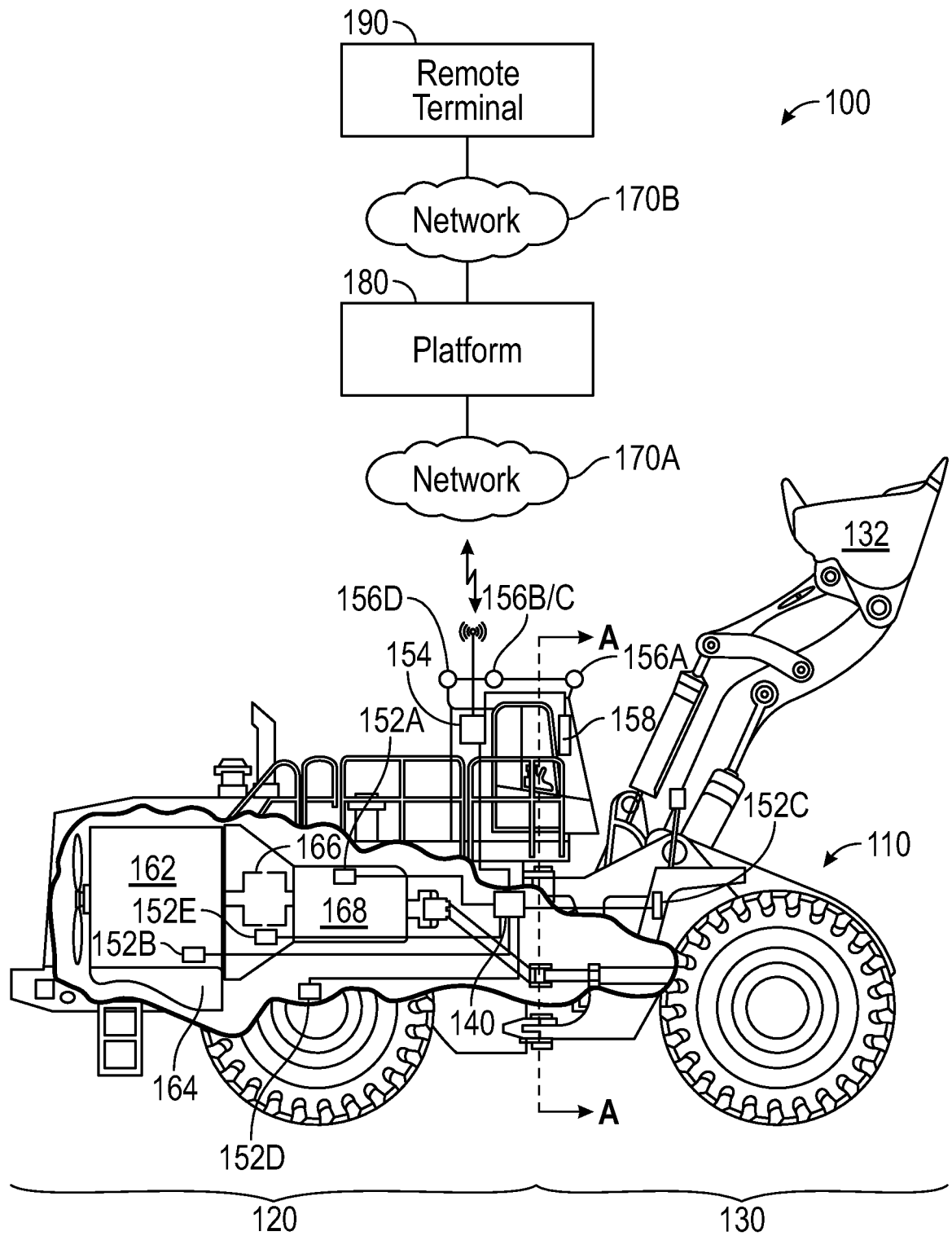
FIG. 1 illustrates a machine environment, according to an embodiment.

FIG. 1 illustrates a machine environment 100, according to an embodiment. Machine environment 100 may include an environment in which one or more mobile equipment 110 perform a task associated within an industry, such as mining, construction, transportation, energy exploration, farming, or the like. For example, machine environment 100 could include one or more mine sites in which a plurality of mobile equipment 110 cooperate to perform a task associated with mining. However, it should be understood that disclosed embodiments are not limited to any particular environment. In addition, while mobile equipment 110 is illustrated as a wheel loader, it should be understood that mobile equipment 110 may be any type of mobile equipment, including a dump truck, asphalt paver, backhoe loader, skid steer, track loader, cold planer, compactor, dozer, electric rope shovel, excavator, forest machine, hydraulic mining shovel, material handler, motor grader, pipe-layer, road reclaimer, telehandler, tractor-scraper, or the like, as well as ordinary road vehicles (e.g., automobiles, semi-trucks, etc.), aircraft, or maritime vessels (e.g., boats, ships, barges, etc.).

In the illustrated example, mobile equipment 110 comprises a rear portion 120 and a front portion 130 that comprises a work implement 132. Front portion 130 may be articulated with respect to rear portion 120, such that front portion 130 is capable of rotating within a range of degrees, relative to rear portion 120, around an axis A. However, it should be understood that disclosed embodiments do not require mobile equipment 110 to comprise an articulated front portion 130. In an alternative example, mobile equipment 110 may comprise non-articulated front and rear potions (e.g., a single, integrated body frame).

Mobile equipment 110 may comprise an electronic control unit (ECU) 140 that is communicatively coupled to one or a plurality of sensors 152A-E (which may be collectively referred to herein as sensor(s) 152) and/or subsystems of mobile equipment 110. ECU 140 may collect data from sensor(s) 152 and/or subsystems and process the collected data. Processing the collected data may comprise determining one or more machine states from the collected data, generating an alert based on the collected data (e.g., if a value of a parameter in the data satisfies a predefined threshold), filtering, analyzing, sorting, correlating, storing, and/or relaying the collected data, and/or the like. ECU 140 may also control the operation of one or more subsystems of mobile equipment 110 based on the collected data and/or operator commands. For example, ECU 140 may be communicatively coupled to a fuel injection system associated with a combustion engine 162 of mobile equipment 110. ECU 140 may receive an operator command (e.g., increase throttle) and provide command signals to the fuel injection system of combustion engine 162, which may responsively increase the flow of fuel from fuel supply 164 to combustion engine 162. Combustion engine 162 may be connected to a torque converter 166 that transmits power from combustion engine 162 to transmission 168.

Sensor(s) 152 may include any type of sensor or sensor array capable of measuring values of one or more parameters of one or more subsystems of mobile equipment 110. Examples of such parameters include, without limitation, engine speed, machine speed, location of mobile equipment 110 (e.g., coordinates acquired via a global navigation satellite system (GNSS), such as the Global Positioning System (GPS)), pressure of a fluid (e.g., fuel, oil, coolant, etc.), flow rate of a fluid, temperature of a fluid, contamination level of a fluid, viscosity of a fluid, electric current, electric voltage, fluid consumption rates, loading level, transmission output ratio, slip, grade, traction, mileage, time or mileage until or since scheduled maintenance, and/or the like.

Mobile equipment 110 may comprise a communication module 154, which may be separate or integral to ECU 140. Communication module 154 may comprise hardware and/or software that enables communication between communication module 154 and an access point of a network 170A. For example, communication module 154 may comprise or be connected to a processor, network interface, and wireless transceiver with an antenna that enables wireless communication with a base station of a cellular network. Communication module 154 may send data to a platform 180 and/or receive data from platform 180 via network 170A. For example, ECU 140 may transmit any of the data that is collected or derived from collected data to platform 180 via communication module 154, as well as receive data, such as control commands, from platform 180 via communication module 154.

Mobile equipment 110 may comprise one or more cameras 156A-D (which may be collectively referred to herein as camera(s) 156). Each camera 156 captures video of a field of view of an area around mobile equipment 110. For example, a forward-facing camera 156A captures a front field of view of an area in front of mobile equipment 110, a right-side-facing camera 156B captures a right field of view of an area to the right of mobile equipment 110, a left-side-facing camera 156C captures a left field of view of an area to the left side of mobile equipment 110, and a rear-facing camera 156D captures a rear field of view of an area in the rear of mobile equipment 110. One or more of cameras 156 may be very wide-angle cameras with a field of view of 120-degrees or greater (e.g., between 120-degrees and 180-degrees). Different cameras 156 may have the same sized or differently sized fields of view. For example, right-side-facing camera 156B and left-side-facing camera 156C may have the same field of view as each other, but have a different field of view than forward-facing camera 156A and/or rear-facing camera 156D. Similarly, forward-facing camera 156A may have a narrower field of view than right-side-facing camera 156B, left-side-facing camera 156C, and rear-facing camera 156D, since fisheye distortion may be more problematic in video from forward-facing camera 156A. In an embodiment, each camera 156 has a maximum field of view that can be narrowed by mechanical, electronic, and/or software means, including in the captured video by software-based correction to eliminate fisheye distortion (e.g., using rectilinear projection). Thus, the field of view that appears in the final video (i.e., intended for viewing by an operator) from each camera 154 may represent the maximum field of view or some angle less (e.g., less than 120-degrees) than the maximum field of view.

Each camera 156 may stream or otherwise transmit the captured video, comprising a plurality of image frames, to platform 180 via communication module 154. Camera(s) 156 may transmit the video directly to communication module 154. Alternatively, camera(s) 156 may transmit the video to ECU 140, which may relay the video in real time (e.g., with or without pre-processing) to platform 180 through communication module 154. As used herein, the term "real time" encompasses events that occur simultaneously, as well as events that are separated by ordinary delays resulting from processing latencies, network latencies, and/or the like.

Mobile equipment 110 may comprise a display console 158. Display console 158 may comprise a plasma display, light-emitting diode (LED) display, liquid crystal display (LCD), and/or the like. In an embodiment, display console 158 may comprise an integrated touch sensor to form a touch panel display which may both display data and receive touch inputs at positions on the display from an operator within the cabin of mobile equipment 110. Alternatively or additionally, display console 158 may receive inputs via other input means, such as keyboards, in-cabin cameras, biometric sensing devices, computer mice, trackballs, pen-based pointing devices, and/or the like. Display console 158 may be communicatively coupled to ECU 140, communication module 154, and/or camera(s) 156. Thus, display console 158 may display a graphical user interface which enables an operator in the cabin of mobile equipment 110 to view data collected by ECU 140 (e.g., real-time values of parameters of one or more subsystems of mobile equipment 110), data derived from data collected by ECU 140 (e.g., machine states, alerts, graphs, charts, tables, etc.), and/or data received from platform 180 via communication module 154, view video captured by camera(s) 156, interact with one or more software applications executed on-board mobile equipment 110 (e.g., within ECU 140), perform an audio or audiovisual communication with another person, and/or the like. Thus, an operator in the cabin of mobile equipment 110 may utilize display console 158 to view the surroundings of mobile equipment 110 via camera(s) 156, access operator assistance tools, receive alerts, dispatch information, operational instructions, and/or recommendations, review environmental data (e.g., weather, temperature, soil conditions, etc.), payload information, productivity data, and/or any other type of information, control one or more subsystems of mobile equipment 110 via commands to ECU 140, initiate or receive an audio or audiovisual call, and/or the like.

In an embodiment, video captured by camera(s) 156 is relayed (e.g., with or without pre-processing) to an external system, and, in the illustrated embodiment, through platform 180 to a remote terminal 190. Platform 180 may host and/or execute one or more of the various functions, processes, methods, and/or software modules described herein. Platform 180 may comprise dedicated servers or may instead be implemented in a computing cloud, so as to utilize shared resources of one or more servers. These servers may be collocated and/or geographically distributed. Platform 180 may be communicatively connected to mobile equipment 110 via network 170A and/or a remote terminal 190 via network 170B. Networks 170A and 170B (which may be collectively referred to herein as network 170) may be the same network, separate and distinct networks, or overlapping networks, and may include one or more cellular networks, one or more satellite networks, the Internet, one or more intranets, and/or the like. While only a single instance of mobile equipment 110 and a single instance of remote terminal 190 are illustrated, it should be understood that platform 110 may be communicatively coupled to any number of mobile equipment 110 and remote terminals 190.

Platform 180 may comprise one or more web servers which host one or more websites and/or web services. In embodiments in which a website is provided, the website may comprise a graphical user interface, including, for example, one or more screens (e.g., webpages) generated in HyperText Markup Language (HTML) or other language. Platform 180 transmits or serves one or more screens of the graphical user interface in response to requests from mobile equipment 110 via network 170A and/or remote terminal 190 via network 170B. These screens may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and/or the like.

In embodiments in which a web service is provided, platform 180 may receive requests from external systems, and provide responses in eXtensible Markup Language (XML), JavaScript Object Notation (JSON), and/or any other suitable or desired format. In such embodiments, platform 180 may provide an application programming interface (API) (e.g., implemented in a Representation State Transfer (REST) architecture) which defines the manner in which mobile equipment 110, remote terminal 190, and/or other external system(s) may interact with the web service. Thus, mobile equipment 110, remote terminal 190, and/or other external systems (which may themselves be servers), can define their own user interfaces, and rely on the web service to implement or otherwise provide the backend processes, methods, functionality, storage, and/or the like, described herein. For example, in such an embodiment, a client application, executing on remote terminal 190, may interact with platform 180 to execute one or more or a portion of one or more of the various functions, processes, methods, and/or software modules described herein. In this case, the client application may generate the graphical user interface and access functionality on platform 180 via the API.

Remote terminal 190 may comprise any type of computing device capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that remote terminal 190 is a remote operating station by which a remote operator can operate mobile equipment 110 through platform 180. In an alternative embodiment, remote terminal 190 may communicate directly with mobile equipment 110 (i.e., without platform 180 acting as intermediary) to operate mobile equipment 110. In either case, remote terminal 190 may comprise one or more displays that display, in real time, video captured by camera(s) 156 and transmitted by communication module 154 of mobile equipment 110. Remote terminal 190 may also comprise one or more input devices that enable an operator to provide operating controls to mobile equipment 110. These operating controls may be transmitted as control commands, directly or via platform 180, to communication module 154, which may relay the control commands to ECU 140. ECU 140 may responsively control the appropriate subsystem of mobile equipment 110 in accordance with the control commands. In general, for safety reasons, each remote terminal 190 should control one mobile equipment 110 at a time. However, this is not a requirement of any embodiment.

Figure 2:
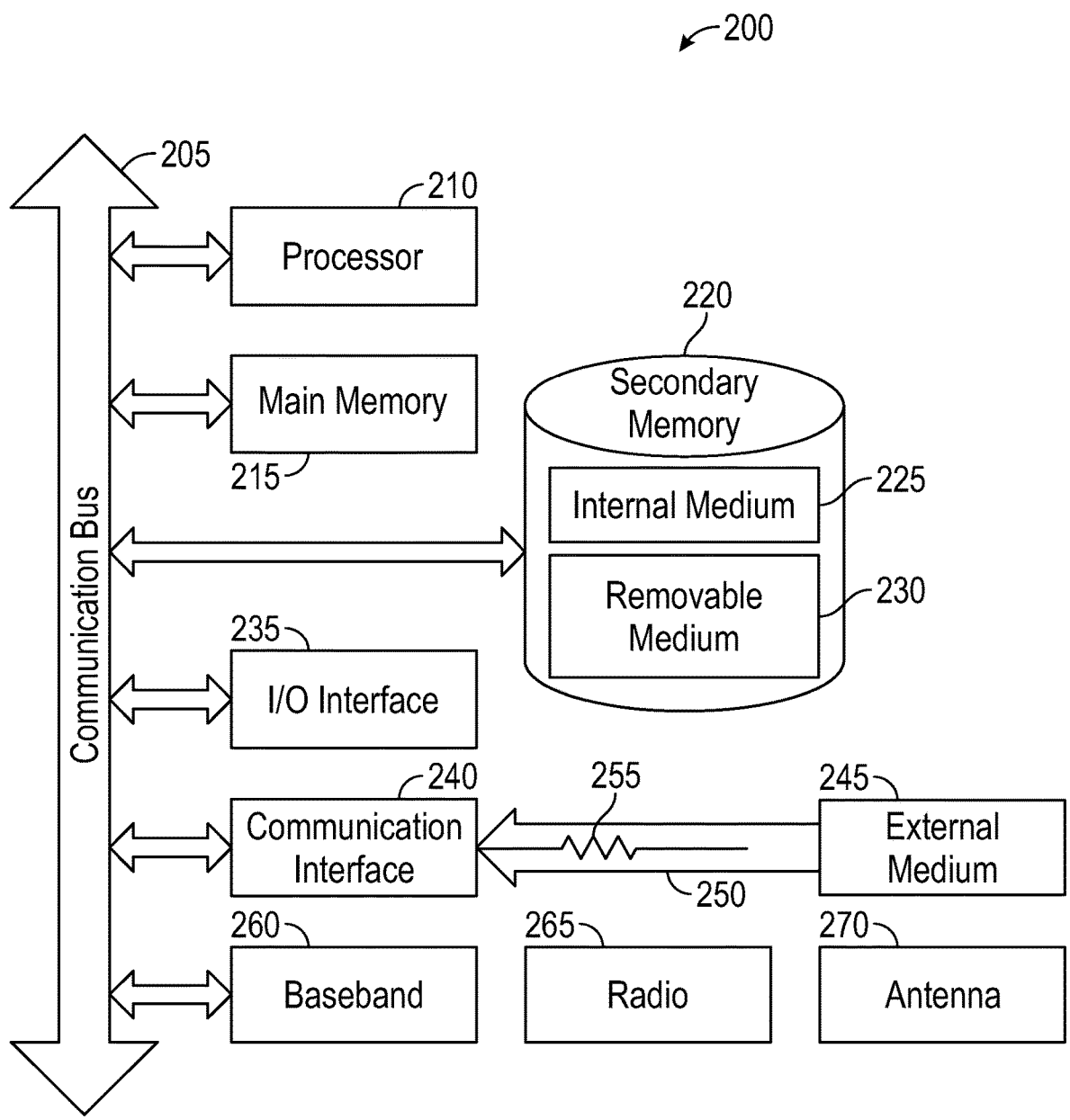
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods described herein (e.g., to store and/or execute the implementing software), and may represent components of mobile equipment 110 (e.g., ECU 140, communication module 154, camera(s) 156, display console 158, etc.), platform 180, remote terminal 190, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE), and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), flash memory (block-oriented memory similar to EEPROM), and the like.

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and the like.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., display console 158, or in a smartphone, tablet computer, or other mobile device).

System 200 may include a communication interface 240. Communication interface 240 allows software and data to be transferred between system 200 and external devices (e.g. printers), networks (e.g., network(s) 170), or other information sources. For example, computer software or executable code may be transferred to system 200 from a network server (e.g., platform 180) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 170) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 170), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

System 200 may also include optional wireless communication components that facilitate wireless communication over a voice network and/or a data network. The wireless communication components (e.g., corresponding to communication module 154) comprise an antenna system 270, a radio system 265, and a baseband system 260. Baseband system 260 is communicatively coupled with processor(s) 210. In system 200, radio frequency (RF) signals are transmitted and received over the air by antenna system 270 under the management of radio system 265.

Figure 3:
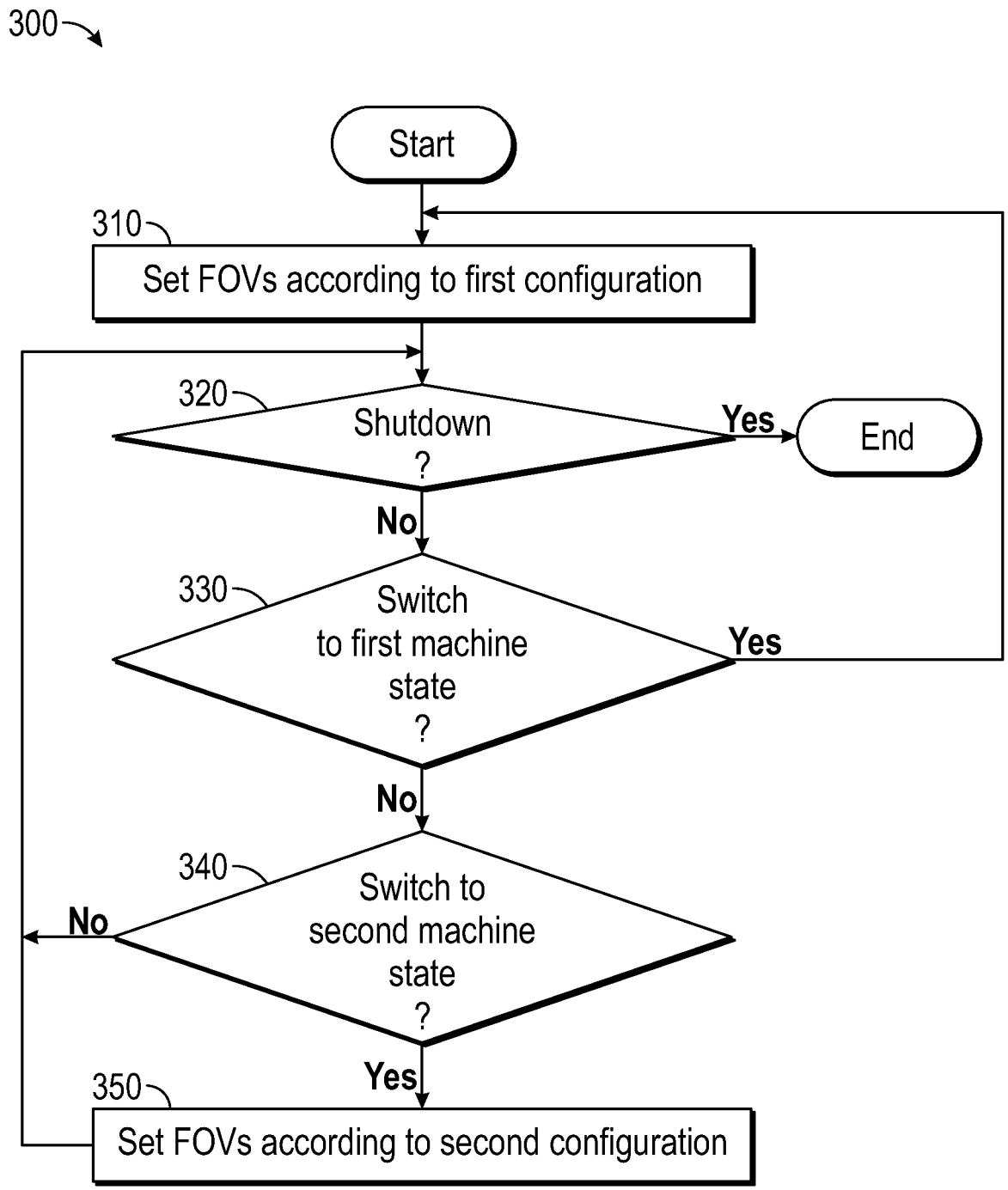
FIG. 3 illustrates a process for automatic FOV adjustment for video on mobile equipment based on machine state, according to an embodiment.

FIG. 3 illustrates a process 300 for automatic FOV adjustment for video on mobile equipment based on machine state, according to an embodiment. While process 300 is illustrated with a certain arrangement and ordering of subprocesses, process 300 may be implemented with fewer, more, or different subprocesses and a different arrangement and/or ordering of subprocesses. It should be understood that any subprocess, which does not depend on the completion of another subprocess, may be executed before, after, or in parallel with that other independent subprocess, even if the subprocesses are described or illustrated in a particular order.

It is contemplated that process 300 is executed on mobile equipment 110. In particular, process 300 may be executed by ECU 140 or another processing device on mobile equipment 110. While process 300 could be executed remotely on an external system, such as platform 180 or remote terminal 190, the communications required to determine machine states at mobile equipment 110 and set configurations at mobile equipment 110 would increase traffic on network 170 and introduce delays, caused by network latencies, into process 300. In an alternative embodiment, a portion of process 300 could be executed on mobile equipment 110, while another portion of process 300 is executed on an external system. However, it should be understood that process 300 is a relatively computationally inexpensive process that should be capable of being entirely executed on mobile equipment 110.

Mobile equipment 110 may be capable of being operated in a plurality of machine states. In an embodiment, this plurality of machine states comprises a first machine state and a second machine state that are distinct. The first machine state may be indicative of non-driving and representative of immobility, which encompasses non-movement or insignificant movement of mobile equipment 110. The second machine state may be indicative of driving and representative of mobility, which encompasses movement or significant movement of mobile equipment 110. For example, the machine states may be determined based on a state of the powertrain of mobile equipment 110, with mobile equipment 110 determined to be in the first machine state when the powertrain is neutralized and in the second machine state when the powertrain is not neutralized. As another example, the machine states may be determined based on the state of the parking brake of mobile equipment 110, with mobile equipment 110 determined to be in the first machine state when the parking brake is engaged and in the second machine state when the parking brake is disengaged. As yet another example, the machine states may be determined based on the measured speed of mobile equipment 110, with mobile equipment 110 determined to be in the first machine state when the measured speed is less than (or equal to) a threshold (e.g., five miles per hour) and in the second machine state when the measured speed is greater than (or equal to) the threshold. It should be understood that the machine states may be determined in any other manner using any other parameter or state whose values can be classified into a binary classification of either immobile or mobile.

Process 300 may start executing when mobile equipment 110 is started up or turned on, and continue until mobile equipment 110 is shutdown or turned off. Initially, upon start-up, mobile equipment 110 will be in the first machine state, which indicates that mobile equipment 110 is immobile. Thus, in subprocess 310 the video captured by camera (s) 156 is processed according to a first configuration.

Subsequently, process 300 monitors for the occurrence of one or more events. In particular, if mobile equipment 110 is shutdown (i.e., "Yes" in subprocess 320), process 300 ends. Otherwise (i.e., "No" in subprocess 320), if mobile equipment 110 switches from the second machine state to the first machine state (i.e., "Yes" in subprocess 330), process 300 returns to subprocess 310 to set the video processing according to the first configuration. Otherwise (i.e., "No" in subprocess 330), if mobile equipment 110 switches from the first machine state to the second machine state (i.e., "Yes" in subprocess 340), the video processing is set according to the second configuration in subprocess 350. Otherwise (i.e., "No" in subprocess 340), process 300 continues to monitor for the occurrence of one of these events. It should be understood that the order of subprocesses 320, 330, and 340 is arbitrary, and that these subprocesses may be performed in any order, including in parallel.

In an embodiment, the determination of whether a switch has been performed in subprocesses 330 and/or 340 may require mobile equipment 110 to remain within the machine state for a predefined threshold amount of time prior to determining that a switch to that machine state has occurred. In other words, before determining that a switch has been made to the first machine state in subprocess 330, mobile equipment 110 must remain in the first machine state, following the switch from the second machine state, for at least the predefined threshold amount of time. Similarly, before determining that a switch has been made to the second machine state in subprocess 340, mobile equipment 110 must remain in the second machine state, following the switch from the first machine state, for at least the predefined threshold amount of time. The predefined threshold amount of time may be set to any suitable amount of time, such as one to several seconds, to prevent a ping-ponging effect between the first configuration and the second configuration, which could be disorienting or otherwise bothersome to the operator.

Figure 4:
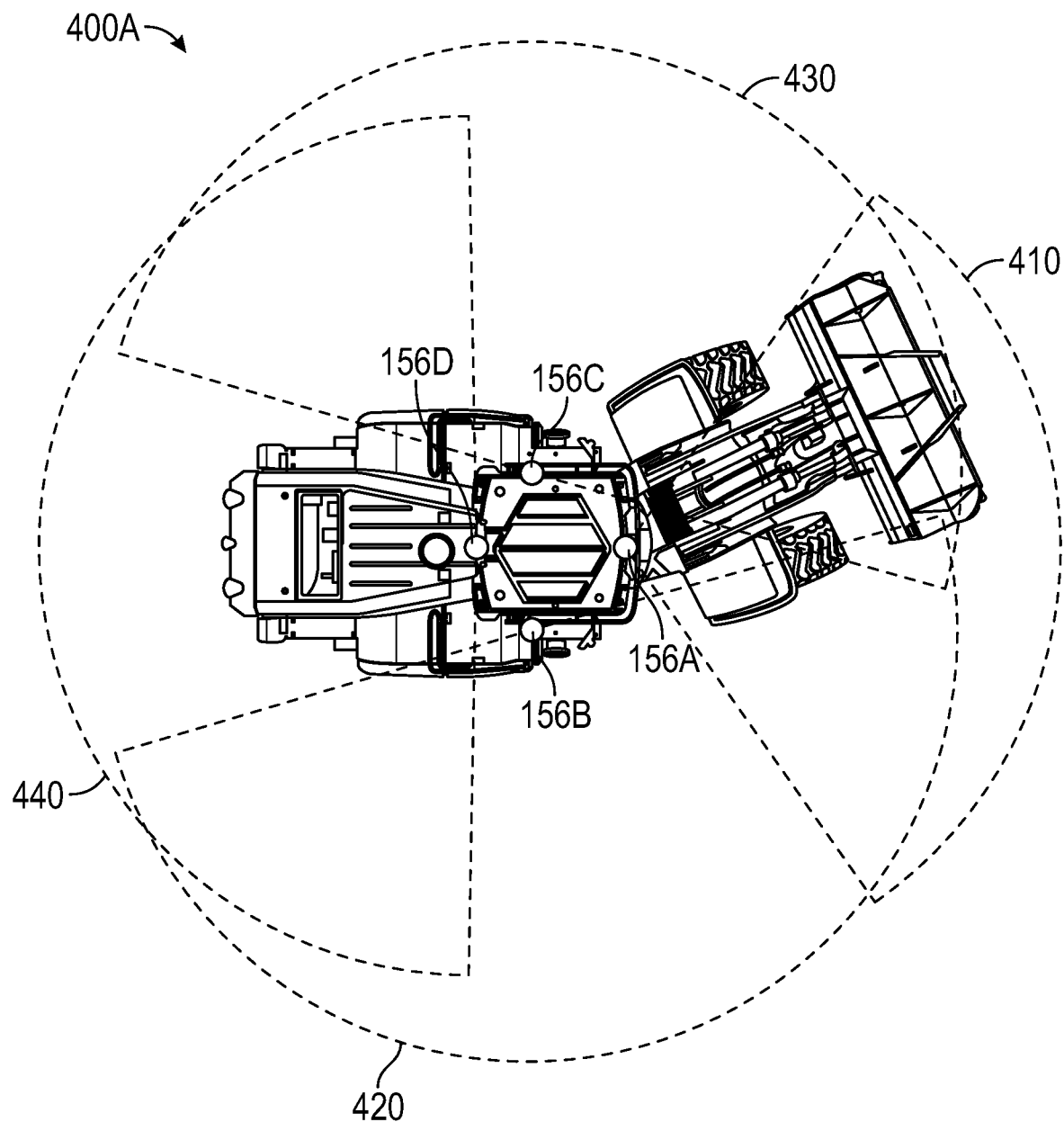
FIGS. 4 and 5 illustrate alternative example FOV configurations, according to an embodiment.

FIG. 4 illustrates an example of a first configuration 400A in process 300 (e.g., set in subprocess 310), according to an embodiment. First configuration 400A defines the processing that is applied to the videos captured from cameras 156A-D. First configuration 400A corresponds to the first machine state, which is indicative of an immobile state of mobile equipment 110.

In first configuration 400A, no distortion correction and/or cropping are applied to the videos captured by cameras 156A-D. Thus, for example, each video will contain the maximum field of view without any correction using rectilinear projection and/or without the cropping that accompanies such correction. For example, no correction is applied to the image frames from forward-facing camera 156A such that front field of view 410 for forward-facing camera 156A is at its maximum, no correction is applied to the image frames from right-side-facing camera 156B such that right field of view 420 for right-side-facing camera 156B is at its maximum, no correction is applied to the image frames from left-side-facing camera 156C such that left field of view 430 for left-side-facing camera 156C is at its maximum, and no correction is applied to the image frames from rear-facing camera 156D such that rear field of view 440 for rear-facing camera 156D is at its maximum. Notably, each of right field of view 420 and left field of view 430 overlap with both front field of view 410 and rear field of view 440, such that the video captured collectively by cameras 156A-D represents a 360-degree view around mobile equipment 110. Thus, the operator, who may be a remote operator at remote terminal 190, can view the full 360-degree area around mobile equipment 110. The operator may use this 360-degree view to ensure that mobile equipment 110 is free from obstacles and personnel using the video from cameras 156A-D, prior to driving mobile equipment 110. Since mobile equipment 110 is immobile (e.g., not moving at all or moving very slowly), the distortion in the video is generally not disorienting to the operator.

Figure 5:
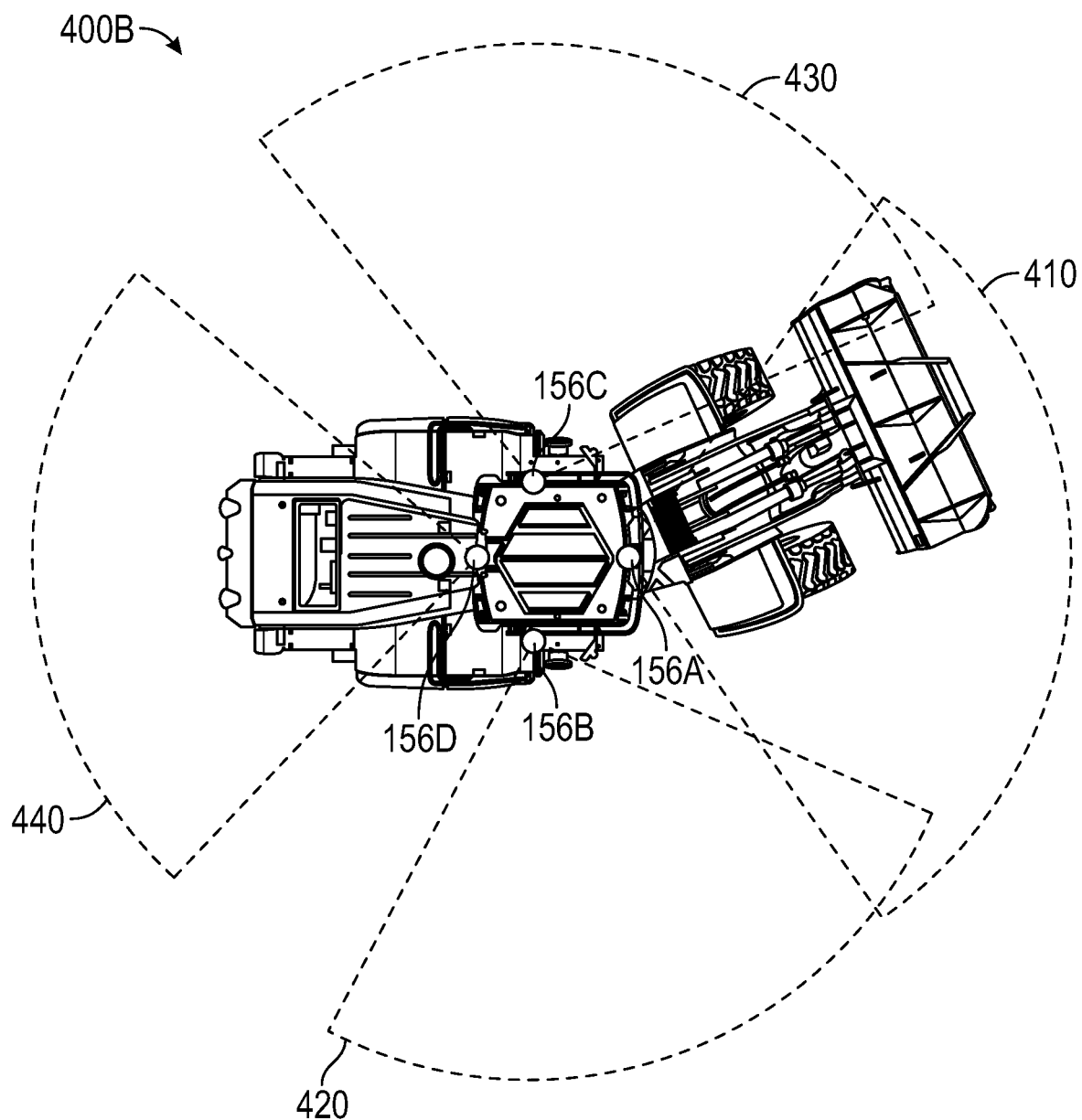

FIG. 5 illustrates an example of a second configuration 400B in process 300 (e.g., set in subprocess 350), according to an embodiment. Second configuration 400B defines the processing that is applied to the videos captured by cameras 156A-D. Second configuration 400B corresponds to the second machine state, which is indicative of a mobile state of mobile equipment 110.

In second configuration 400B, the video from one or more cameras 156A-D may be corrected, for example, using rectilinear projection with associated cropping. In this case, some videos may contain less than the maximum field of view that is available from the capturing cameras 156. For instance, in the illustrated example, correction is applied to the image frames from right-side-facing camera 156B such that right field of view 420 is reduced from its maximum, correction is applied to the image frames from left-side-facing camera 156C such that left field of view 430 is reduced from its maximum, and correction is applied to the image frames from rear-facing camera 156D such that rear field of view 440 is reduced from its maximum. In other words, right field of view 420, left field of view 430, and rear field of view 440 are reduced by the correction for fisheye distortion. Consequently, the videos captured collectively by cameras 156 represent less than a 360-degree view around mobile equipment 110. However, as a result of the fisheye-distortion corrections applied in second configuration 400B, the operator may drive mobile equipment 110 using the video from cameras 156A-D without becoming disoriented by fisheye distortion in the video.

Notably, in this example, forward-facing camera 156A is not a very wide-angle camera, and therefore, no correction is applied to the image frames from forward-facing camera 156A in either first configuration 400A or second configuration 400B. However it should be understood that in an alternative embodiment, forward-facing camera 156A may also be a very wide-angle camera and/or correction may be applied to the image frames from forward-facing camera 156A in second configuration 400B while not being applied to the images frames from forward-facing camera 156A in first configuration 400A. It should also be understood that other configurations are possible for first configuration 400A and/or second configuration 400B, including correction of image frames in the video from all cameras 156 in the second configuration, correction of image frames in the video from a different subset of cameras 156 in the second configuration, correction of image frames in the video from one or more cameras 156 in the first configuration, and/or the like. It should also be understood that different arrangements of cameras 156A-D may be used and/or fewer or more cameras 156 than those illustrated may be used with configuration of their respective video processing in first configuration 400A and second configuration 400B.

Notably, even in second configuration 400B, right field of view 420 and left field of view 430 overlap front field of view 410. However, right field of view 420 and left field of view 430 no longer overlap rear field of view 440, creating a right-rear blind spot between right field of view 420 and rear field of view 440 and a left-rear blind spot between left field of view 430 and rear field of view 440. In an embodiment, second configuration 400B may process the video from cameras 156A-D to prioritize area(s) that are in a direction in which mobile equipment 110 is capable of traveling. For example, if mobile equipment 110 is traveling straight forward, full correction may be applied to forward-facing camera 156A, partial correction may be applied to right-side-facing camera 156B and left-side facing camera 156C, and no correction may be applied to rear-facing camera 156D. If mobile equipment 110 is turning right, full correction may be applied to forward-facing camera 156A and right-side-facing camera 156B, partial correction may be applied to left-side-facing camera 156C, and no correction may be applied to rear-facing camera 156D. Similarly, if mobile equipment 110 is turning left, full correction may be applied to forward-facing camera 156A and left-side-facing camera 156C, partial correction may be applied to right-side-facing camera 156B, and no correction may be applied to rear-facing camera 156D. If mobile equipment 110 is traveling in reverse, full correction may be applied to rear-facing camera 156D, partial correction may be applied to right-side-facing camera 156B and left-side facing camera 156C, and no correction may be applied to front-facing camera 156A.

In addition, when performing correction or cropping image frames for a given camera 156 in a given configuration, such that a field of view in the video is reduced, the reduction in the field of view may be biased towards a side of the image frames that is away from the direction of travel. In other words, the field of view is maximized on a side of the image frames that are towards the direction of travel. Thus, for example, if mobile equipment 110 is traveling forward, the correction to right field of view 420 may be weighted more heavily towards the left side of each image frame (i.e., closer to the front of mobile equipment 110) with more cropping on the right side of each image frame than on the left side, and the correction to left field of view 430 may be weighted more heavily towards the right side of each image frame (i.e., closer to the front of mobile equipment 110) with more cropping on the left side of each image frame than on the right side. Similarly, if mobile equipment 110 is traveling in reverse, the correction to right field of view 420 may be weighted more heavily towards the right side of each image frame (i.e., closer to the rear of mobile equipment 110) with more cropping on the left side of each image frame than on the right side, and the correction to left field of view 430 may be weighted more heavily towards the left side of each image frame (i.e., closer to the rear of mobile equipment 110) with more cropping on the right side of each image frame than on the left side.

While only two machine states and two configurations are illustrated, three or more machines states and configurations may be used. For example, a first configuration may be associated with a first machine state representing complete immobilization of mobile equipment 110 (e.g., machine speed of zero), a second configuration may be associated with a second machine state representing insignificant mobilization of mobile equipment 110 (e.g., machine speed greater than zero but less than a low-speed threshold, such as five miles per hour), and a third configuration may be associated with a third machine state representing significant mobilization of mobile equipment 110 (e.g., machine speed greater than the low-speed threshold). It should be understood that process 300 may be easily adapted to such a modification by adding a triggering event for the third machine state (e.g., replicating subprocesses 340 and 350 for a third machine state and third configuration, respectively). Any number of machine states and configurations can be incorporated in this manner.

It should be understood that, in the second configuration, the fisheye distortion correction may be full correction or partial correction. Similarly, the first configuration, although illustrated with no fisheye distortion correction, may include partial or full correction for the video from one or more cameras 156. In more general terms, there may be a plurality of machine states, each representing a level of mobility and associated with one of a plurality of configurations. Each of those plurality of configurations may define video processing that results in the collective video from cameras 156 having a certain total field of view and level of distortion. Each configuration associated with a machine state representing a higher level of mobility may generally have a smaller total field of view and a lower total level of distortion than any configuration associated with a machine state representing a lower level of mobility. Conversely, each configuration associated with a machine state representing a lower level of mobility may generally have a greater total field of view and a higher total level of distortion than any configuration associated with a machine state representing a higher level of mobility.

INDUSTRIAL APPLICABILITY

Mobile equipment 110 may be configured for remote operation by arranging cameras 156 at different mounted positions to capture video, representing a full 360-degree view, of the area surrounding mobile equipment 110. In order to reduce the number (and therefore, cost) of cameras 156, at least some of these cameras 156 may be very wide-angle cameras (e.g., 120-degree field of view or greater). However, video captured from very wide-angle cameras is subject to distortion, which can be disorienting to a remote operator of mobile equipment 110. While the video can be corrected using rectilinear projection, such correction typically results in the loss of a portion of the field of view from each camera 156. This reduction in the fields of view can prevent a full 360-degree view around mobile equipment 110, thereby causing blind spots and reducing safety within machine environment 100.

Disclosed embodiments solve this problem by adjusting the fields of view of cameras 156, depending on a machine state of mobile equipment 110. In particular, if the machine state indicates that mobile equipment 110 is immobile (e.g., not moving and/or moving at a low speed), the video from cameras 156 may be configured so as not to undergo any correction, such that the maximum field of view is visible in the video from each camera 156. Thus, a remote operator can view the maximum amount of area surrounding mobile equipment 110 (e.g., a full 360-degree view) prior to driving mobile equipment 110. This enables the remote operator to identify all obstacles and personnel prior to moving mobile equipment 110, thereby improving safety within machine environment 100. This is similar to the walk-around that an on-site operator, who is physically present at mobile equipment 110, would typically perform. Since mobile equipment 110 is not yet moving, the distortion in the video will not be disorienting to the remote operator.

Conversely, if the machine state indicates that mobile equipment 110 is mobile (e.g., moving or moving at medium-to-high speed), the video from cameras 156 may be configured to undergo correction (e.g., using rectilinear projection, for example, according to the Scaramuzza camera model), which will reduce or eliminate the distortion in the video, but may result in the loss of some field of view in the video and less than a full 360-degree view of the area around mobile equipment 110. Even though blind spots may exist, the remote operator will be able to drive mobile equipment 110 without becoming disoriented by fisheye distortion within the video, thereby improving safety within machine environment 100.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in mobile equipment for industrial applications, it will be appreciated that it can be implemented in various other types of mobile equipment and machines that transition between immobile and mobile states, and in various other systems and environments.

Furthermore, there is no intention to be bound by any theory presented in any preceding section. It is also understood that the illustrations are not necessarily drawn to scale and may include exaggerated dimensions and graphical representation to better illustrate the referenced items shown, and are not considered limiting unless expressly stated as such. In other words, the features disclosed in various embodiments may be implemented using different relative dimensions within and between components than those illustrated in the drawings.

What is claimed is:

1. A method comprising using at least one hardware processor to:
monitor for a plurality of machine states of a mobile equipment, wherein the plurality of machine states includes a first machine state representing that the mobile equipment is immobile, and a second machine state representing that the mobile equipment is mobile;
when detecting a switch from the first machine state to the second machine state, switch from a first configuration for processing video, captured by a plurality of cameras mounted on the mobile equipment, to a second configuration for processing the video, wherein the video in the first configuration has a wider field of view than the video in the second configuration; and,
when detecting a switch from the second machine state to the first machine state, switch from the second configuration to the first configuration.

2. The method of claim 1, wherein, in the second configuration, the video captured by the one or more cameras is corrected for distortion using rectilinear projection on a plurality of image frames in the video.

3. The method of claim 1, further comprising using the at least one hardware processor to:
detect the first machine state when one or more of a powertrain of the mobile equipment is neutralized, a parking brake of the mobile equipment is engaged, or a speed of the mobile equipment is less than a predefined threshold; and
detect the second machine state when one or more of the powertrain is not neutralized, the parking brake is not engaged, or the speed is greater than the predefined threshold.

4. The method of claim 1, wherein, after the processing in the first configuration, the video captured collectively by the plurality of cameras represents a 360-degree view around the mobile equipment.

5. The method of claim 4, wherein, after the processing in the second configuration, the video captured collectively by the plurality of cameras represents less than a 360-degree view around the mobile equipment.

6. The method of claim 1, wherein the plurality of cameras comprises:
a forward-facing camera that captures a front field of view of an area in front of the mobile equipment;
a right-side-facing camera that captures a right field of view of an area to a right side of the mobile equipment;
a left-side-facing camera that captures a left field of view of an area to a left side of the mobile equipment; and
a rear-facing camera that captures a rear field of view of an area to a rear of the mobile equipment.

7. The method of claim 6, wherein, after the processing in the first configuration, each of the right field of view and the left field of view overlaps with both the front field of view and the rear field of view in the video, such that the video captured collectively by the plurality of cameras represents a 360-degree view around the mobile equipment.

8. The method of claim 7, wherein, after the processing in the second configuration, one or more of the right field of view, the left field of view, or the rear field of view in the video are reduced by correction for fisheye distortion.

9. The method of claim 1, wherein the at least one hardware processor is comprised in the mobile equipment.

10. The method of claim 9, further comprising using the at least one hardware processor to transmit the video over a wireless network to at least one external system.

11. The method of claim 10, further comprising using the at least one hardware processor to:
receive control commands over the wireless network from the at least one external system; and
control one or more subsystems of the mobile equipment according to the received control commands.

12. The method of claim 1, wherein the at least one hardware processor is comprised in an electronic control unit of the mobile equipment.

13. A mobile equipment comprising:
a plurality of cameras; and
at least one hardware processor that
monitors for a plurality of machine states of the mobile equipment, wherein the plurality of machine states include a first machine state representing that the mobile equipment is immobile, and a second machine state representing that the mobile equipment is mobile,
when detecting a switch from the first machine state to the second machine state, switches from a first configuration for processing video, captured by the plurality of cameras, to a second configuration for processing the video, wherein the video in the first configuration has wider field of view than the video in the second configuration, and,
when detecting a switch from the second machine state to the first machine state, switches from the second configuration to the first configuration.

14. The mobile equipment of claim 13, wherein the at least one hardware processor:
detects the first machine state when one or more of a powertrain of the mobile equipment is neutralized, a parking brake of the mobile equipment is engaged, or a speed of the mobile equipment is less than a predefined threshold; and
detects the second machine state when one or more of the powertrain is not neutralized, the parking brake is not engaged, or the speed is greater than the predefined threshold.

15. The mobile equipment of claim 13, further comprising a communication module including an antenna, wherein the at least one hardware processor is configured to transmit the video over a wireless network to at least one external system via the communication module.

16. The mobile equipment of claim 13, wherein the at least one hardware processor is further configured to:
receive control commands over the wireless network from the at least one external system; and
control one or more subsystems of the mobile equipment according to the received control commands.

17. The mobile equipment of claim 13, wherein, after processing in the first configuration, the video captured collectively by the plurality of cameras represents a 360-degree view around the mobile equipment.

18. The mobile equipment of claim 17, wherein, after processing in the second configuration, the video captured collectively by the plurality of cameras represents less than a 360-degree view around the mobile equipment.

19. A non-transitory computer-readable medium having instructions stored thereon, wherein the instructions, when executed by a processor, cause the processor to:
monitor for a plurality of machine states of a mobile equipment, wherein the plurality of machine states include a first machine state representing that the mobile equipment is immobile, and a second machine state representing that the mobile equipment is mobile;
when detecting a switch from the first machine state to the second machine state, switch from a first configuration for processing video, captured by a plurality of cameras mounted on the mobile equipment, to a second configuration for processing the video, wherein the video in the first configuration has a wider field of view than the video in the second configuration; and,
when detecting a switch from the second machine state to the first machine state, switch from the second configuration to the first configuration.

20. The non-transitory computer-readable medium of claim 1, wherein the instructions cause the processor to:
detect the first machine state when one or more of a powertrain of the mobile equipment is neutralized, a parking brake of the mobile equipment is engaged, or a speed of the mobile equipment is less than a predefined threshold; and
detect the second machine state when one or more of the powertrain is not neutralized, the parking brake is not engaged, or the speed is greater than the predefined threshold.

* * * * *